United States Patent
Chen et al.

(10) Patent No.: US 9,716,381 B2
(45) Date of Patent: Jul. 25, 2017

(54) ELECTROSTATIC DISCHARGE CLAMP CIRCUIT FOR ULTRA-LOW POWER APPLICATIONS

(71) Applicant: The Regents of The University of Michigan, Ann Arbor, MI (US)

(72) Inventors: Yen-po Chen, Ann Arbor, MI (US); Yoonmyung Lee, Ann Arbor, MI (US); Jae-Yoon Sim, Pohang (KR); Massimo Alioto, Singapore (SG); Dennis Sylvester, Ann Arbor, MI (US); David Blaauw, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 419 days.

(21) Appl. No.: 14/491,017

(22) Filed: Sep. 19, 2014

(65) Prior Publication Data
US 2015/0085406 A1   Mar. 26, 2015

Related U.S. Application Data

(60) Provisional application No. 61/880,412, filed on Sep. 20, 2013.

(51) Int. Cl.
*H02H 9/04* (2006.01)
*H02H 1/04* (2006.01)

(52) U.S. Cl.
CPC .............. *H02H 9/046* (2013.01); *H02H 1/04* (2013.01); *H02H 9/04* (2013.01)

(58) Field of Classification Search
CPC ............ H01H 1/04; H02H 9/046; H02H 1/04; H02H 9/04
See application file for complete search history.

(56) References Cited

U.S. PATENT DOCUMENTS

| | | | | |
|---|---|---|---|---|
| 6,545,520 B2* | 4/2003 | Maloney | ............. | H01L 27/0285 327/112 |
| 7,221,551 B2* | 5/2007 | Chen | ................... | H01L 27/0266 361/111 |

(Continued)

OTHER PUBLICATIONS

C. Wang, et al "Design of Power-Rail ESD Clamp Circuit With Ultra-Low Standby Leakage Current in Nanoscale CMOS Technology", IEEE Journal of Solid-State Circuits, vol. 44, No. 3 (Mar. 2009).

(Continued)

*Primary Examiner* — Zeev V Kitov
(74) *Attorney, Agent, or Firm* — Harness, Dickey & Pierce, P.L.C.

(57) ABSTRACT

An electrostatic discharge clamp circuit is provided for low power applications. The clamp circuit includes: a detection circuit, a bias circuit and a shunting circuit having at least one shunt transistor. The detection circuit is configured to detect an occurrence of an electrostatic charge on a power supply node and trigger discharge of the electrostatic charge through the shunting circuit. The bias circuit is coupled between the detection circuit and the shunting circuit and applies a bias voltage to the gate terminal of the shunt transistor. During an electrostatic discharge event, the bias circuit is configured to generate a bias voltage that is substantially equal to the supply voltage; whereas, during the absence of an electrostatic discharge event, the bias circuit is configured to generate a bias voltage that is substantially half of the supply voltage.

27 Claims, 9 Drawing Sheets

(56) References Cited

U.S. PATENT DOCUMENTS

| | | | | |
|---|---|---|---|---|
| 2002/0066929 | A1* | 6/2002 | Voldman | H01L 27/0251 |
| | | | | 257/355 |
| 2011/0128657 | A1* | 6/2011 | Akai | H01L 27/0285 |
| | | | | 361/56 |
| 2012/0250194 | A1* | 10/2012 | Gallerano | H01L 27/0262 |
| | | | | 361/56 |

OTHER PUBLICATIONS

M. Ker, et al "ESD Protection for Mixed-Voltage I/O Low-Voltage Thin-Oxide CMOS", 2006 IEEE International Solid-State Circuits Conference, 1-4244-0079-1.06 (2006).

M. Ker et al., "On the Design of Power-Rail ESD Clamp Circuit With Consideration of Gate Leakage Current in 65-nm Low-Voltage CMOS Process", IEEE International Symposium on Circuits and Systems, pp. 2281-2284 (2009).

P. Chiu et al., "Design of Low-Leakage Power-Rail ESD Clamp Circuit with MOM Capacitor and STSCR in a 65-nm CMOS Process", IEEE International Conference on IC Design & Technology, pp. 1-4, (2011).

* cited by examiner

FIG. 1

Detection Circuits
563.4pA (71.2%)

Shunt Device GIDL
171.8pA (21.7%)

Shunt Device
Subthreshold
56.6pA (7.1%)

ELECTROSTATIC DISCHARGE CLAMP CIRCUIT FOR ULTRA-LOW POWER APPLICATIONS

CROSS-REFERENCE TO RELATED APPLICATIONS

This application claims the benefit of U.S. Provisional Application No. 61/880,412, filed on Sep. 20, 2013. The entire disclosure of the above application is incorporated herein by reference.

GOVERNMENT CLAUSE

This invention was made with government support under grant number CNS1111541 awarded by the National Institutes of Health. The Government has certain rights in this invention.

FIELD

The present disclosure relates to electrostatic discharge clamp circuits for ultra-low power applications.

BACKGROUND

Robustness against electrostatic discharge (ESD) is a critical reliability issue in advanced CMOS technologies. To prevent circuit damage due to ESD events (which can expose the circuit to kV range voltages), ESD clamp circuits are typically incorporated in supply pad library cells. These circuits use extremely wide devices (100 s of μm) and thus exhibit leakage currents of 10 nA to 10 pA (at 25° C. and 125° C., respectively) despite the use of various low power approaches. Recently, there has been increased interest in ultra-low power wireless sensor node systems with constrained battery sizes and system standby power budgets as low as 10-100 nW. Considering the need for multiple power pads, these systems cannot use existing ESD structures due to their high leakage, thereby compromising their reliability.

To address this challenge, the present disclosure provides three ultra-low leakage ESD circuits that use special biasing structures to reduce subthreshold leakage and gate-induced drain leakage (GIDL) while maintaining ESD protection. In 180 nm silicon test chip results, the proposed clamp circuit demonstrate 10 s of pA (nA) operation at room temperature (125° C.), which is a >100× improvement over prior state of the art.

This section provides background information related to the present disclosure which is not necessarily prior art.

SUMMARY

This section provides a general summary of the disclosure, and is not a comprehensive disclosure of its full scope or all of its features.

An electrostatic discharge clamp circuit is provided for low power applications. The clamp circuit includes: a detection circuit, a bias circuit and a shunting circuit having at least one shunt transistor. The detection circuit is configured to detect an occurrence of an electrostatic charge on a power supply node and trigger discharge of the electrostatic charge through the shunting circuit. The bias circuit is coupled between the detection circuit and the shunting circuit and applies a bias voltage to the gate terminal of the shunt transistor. During an electrostatic discharge event, the bias circuit is configured to generate a bias voltage that is substantially equal to the supply voltage; whereas, during the absence of an electrostatic discharge event, the bias circuit is configured to generate a bias voltage that is substantially half of the supply voltage.

The clamp circuit may further include a capacitor electrically coupled between the supply voltage and a detection node, where the detection circuit is electrically connected via the detection node to the bias circuit.

In one aspect, the bias circuit is further defined as two MOS-based transistors coupled in series, such that a drain terminal of the upper MOSFET is coupled at a bias node to a source terminal of the lower MOSFET and the bias node is coupled to the gate terminal of a transistor in the shunting circuit. To interface with the detection circuit, the gate terminal of the upper MOSFET is coupled via an inverter to the detection node and the gate terminal of lower MOSFET is coupled directly to the detection node.

In another aspect, the bias circuit is further defined as an even number of diode-connected MOSFETs coupled in series, where half of the diode-connected MOSFETs are coupled at a bias node to the other half of the diode-connected MOSFETs and the bias node is coupled to the gate terminal of a transistor in the shunting circuit. The bias circuit further includes a driving MOSFET with a source terminal coupled to the supply voltage, the drain terminal coupled to the bias node and a gate terminal coupled via an inverter to the detection node.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
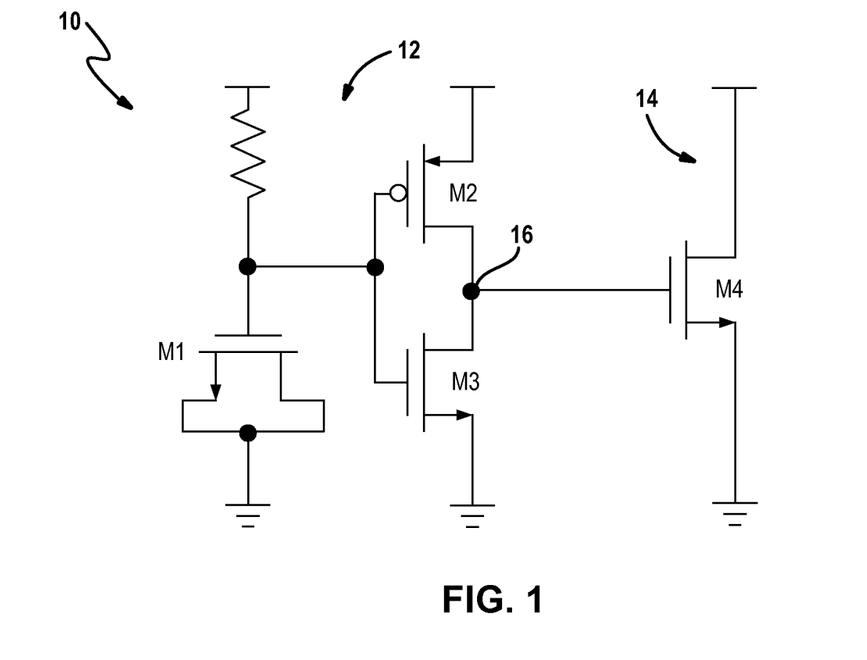
FIG. 1 is a schematic of a conventional electrostatic discharge clamp circuit.

FIG. 1 depicts a conventional electrostatic discharge clamp circuit 10. The clamp circuit 10 is comprised generally of a detection circuit 12 and a shunting circuit 14. The detection circuit 12 includes an RC filter and an inverter. In this example, the inverter is a static CMOS inverter comprised of transistor M2 and transistor M3. The shunting circuit 14 is comprised of a single shunt transistor M4.

When a high voltage is applied to the supply rail (e.g., due to an electrostatic discharge (ESD) event), transistor M2 turns on, pulling up the detection node 16 and allowing the electrostatic charge to be dissipated through the shunt device M4 to ground. The key parameters for achieving high voltage protection are the size of the shunt transistor M4 and the speed at which the detection node 16 is pulled up. After the charge is dissipated, the resistor pulls up the inverter input to turn off the clamp.

Figure 2:
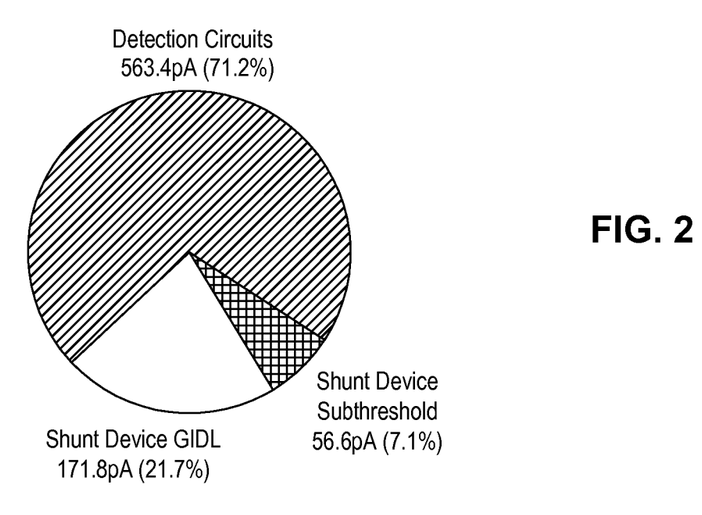
FIG. 2 is a chart depicting the power breakdown of the conventional electrostatic discharge clamp circuit.

FIG. 2 illustrates the power breakdown for this conventional ESD clamp circuit 10. Most of the power is consumed by the detection circuit 12. In particular, the pull-up transistor M2 dominates leakage because it is sized to speed up detection and exhibits poor subthreshold slope as compared to the other transistors. Subthreshold leakage and gate-induced drain leakage associated with the shunt transistor M4 are the other two primary contributors to power consumption. Accordingly, this disclosure proposes ESD clamp circuits with bias mechanisms that reduce subthreshold leakage and gate-induced drain leakage (GIDL) while maintaining ESD protection.

Figure 3:
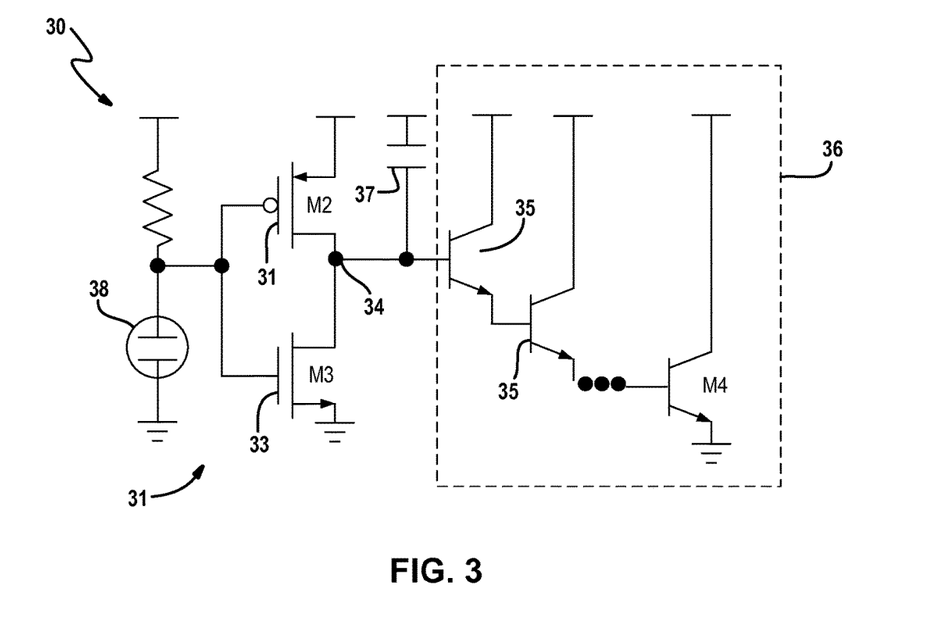
FIG. 3 is a schematic of a first example embodiment of an electrostatic discharge clamp circuit with a modified BJT-based structure.

FIG. 3 depicts a first example of a clamp circuit 30 which reduces leakage in the detection circuit. The clamp circuit 30 is comprised generally of a detection circuit 31 electrically connected via a detection node 34 to a shunting circuit 36. The detection circuit 31 is configured to detect an occurrence of an electrostatic charge on a power supply node (e.g., a supply pad in an IC) and triggers discharge of the electrostatic charge through the shunting circuit 31 as further described below. In the example embodiment, the detection circuit 31 includes an inverter with an input coupled to an RC filter. In this example, the inverter is a static CMOS inverter comprised of first transistor 32 (e.g., p-type MOSFET) and a second transistor 33 (e.g., n-type MOSFET) although other types of inverter circuits are contemplated by this disclosure. In the RC filter, a metal-insulator-metal capacitor 38 (MIMCAP) replaces the conventional MOS capacitor. Although leakage through the MOS capacitor in this technology is small (<2 pA), for a scalable low-leakage approach, a MIMCAP is preferably used in the RC filter. Likewise other implementations for the RC filter are contemplated by this disclosure. Moreover, it is readily understood that the broader aspects of this disclosure are applicable to other types of detection circuits.

To limit leakage through the shunt transistor M4, this embodiment employs bipolar junction transistors in the shunting circuit 36, which provide lower off-current than MOSFETs. However, in standard CMOS technologies only parasitic BJTs with small current gains are available, making it necessary to use a Darlington-like structure. Thus, in this example embodiment, the shunting circuit 36 is comprised of two or more bipolar junction transistors 35 in a Darlington arrangement.

In the event of an electrostatic discharge event, the first transistor 32 turns on and pulls up the voltage at the detection node 34. As a result, the bipolar junction transistors 35 are turned on and the electrostatic charge on the supply line is discharged through the shunting transistor M4. In the absence of an electrostatic discharge event, the first transistor 32 remains off and thus the transistors 35 comprising the shunting circuit also remain off.

Figure 4:
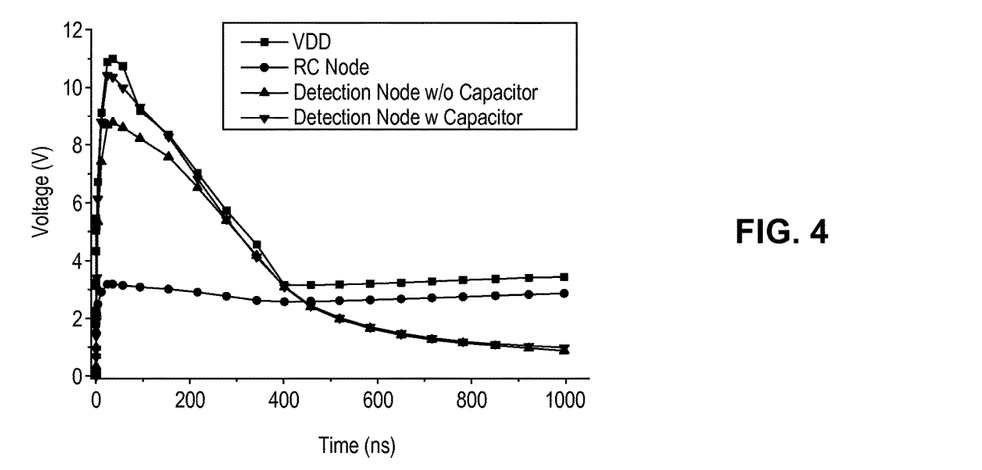
FIG. 4 is a graph illustrating simulated waveforms of the electrostatic discharge clamp circuit shown in FIG. 3.

To address leakage in the first transistor 32, a capacitor 37 can be electrically coupled between the supply voltage and the detection node 34. At the onset of an ESD event, the supply voltage rises rapidly and this capacitor 37 couples the detection node up, thereby allowing the first transistor 32 to be downsized (near min-size) while maintaining the same effective turn-on speed and ESD robustness. Simulated waveforms of the detection node show that the capacitor 37 with the downsized transistor 31 slightly improves response time as seen in FIG. 4. Overall, these modifications offer a ten times leakage reduction at 25° C. and over a hundred times leakage reduction at 125° C. However, the parasitic BJTs introduce several technology scaling concerns that make MOS-based solutions preferable.

Figure 5:
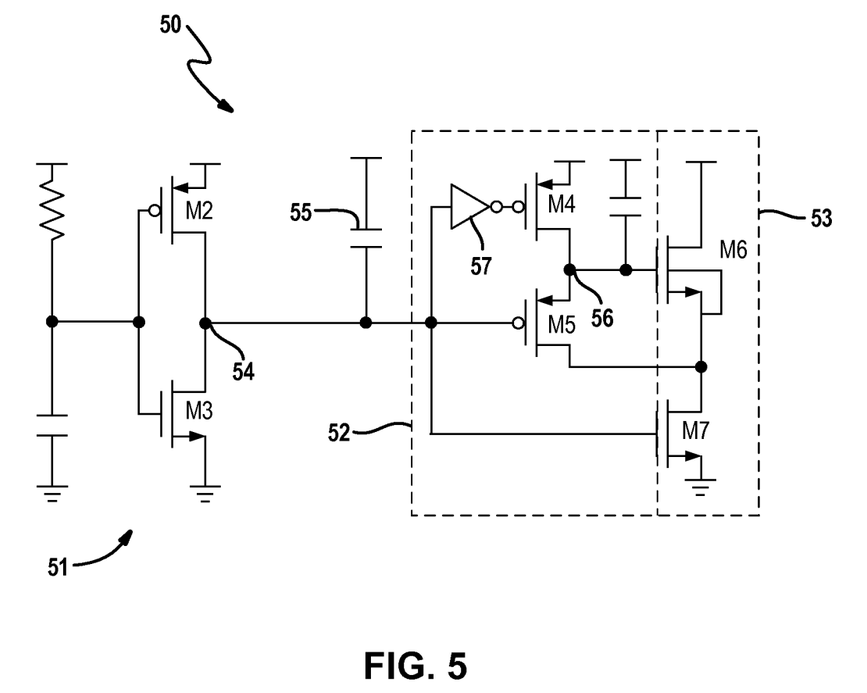
FIG. 5 a schematic of a second example embodiment of an electrostatic discharge clamp circuit with two MOS-based shunt devices.

FIG. 5 depicts a second example of a clamp circuit 50 designed to reduce gate-induced drain leakage but with better scalability and improved density. The clamp circuit 50 is comprised generally of a detection circuit 51, a bias circuit 52 and a shunting circuit 53. The detection circuit 31 is configured to detect an occurrence of an electrostatic charge on a power supply node and triggers discharge of the electrostatic charge through the shunting circuit 53, where the shunting circuit 53 includes at least one shunt transistor. The bias circuit 52 is electrically coupled between the detection circuit 51 and the shunting circuit 53 and applies a bias voltage to the gate terminal of the shunt transistor. During an electrostatic discharge event, the bias circuit 52 is configured to generate a bias voltage that is substantially equal to the supply voltage; whereas, during the absence of an electrostatic discharge event, the bias circuit 52 is configured to generate a bias voltage that is substantially half of the supply voltage. Each of these circuits is further described below.

In an example embodiment, the detection circuit 51 can be implemented in the same manner as described above in relation to FIG. 3. To address leakage in the first transistor M2, a capacitor 55 can again be coupled between the supply voltage and the detection node 54. Variants to the detection circuit 51 are also contemplated by this disclosure.

For the shunting circuit 53, MOS-based structures offer similar leakage reduction gains to BJTs with better scalability and improved density. One approach to reduce MOSFET leakage is stacking, which yields a 2.9× subthreshold leakage reduction in 180 nm CMOS. Accordingly, the shunting circuit 53 is comprised of two MOSFETs M6, M7 coupled in series with each other. Of note, these two MOSFETs have the same type of charge carrier (i.e., n-type) and the same size gate terminals. When there is no ESD event, the gate and source of shunt transistor M6 are shorted and the two stacked shunt transistors M6 and M7 act as a voltage divider.

As a result, the key gate-induced drain leakage (GIDL) parameter $V_{dg}$ is reduced by half for both transistors, lowering GIDL by 5.4×. When an ESD event occurs, the two transistors M6 and M7 turn on to remove the electrostatic charge.

To bias the shunting transistors in this manner, the bias circuit 52 is comprised of two transistors M4 and M5 coupled in series. More specifically, a p-type MOSFET M4 is coupled in series with another p-type MOSFET M5, such that a drain terminal of MOSFET M4 is coupled at a bias node 56 to a source terminal of the MOSFET M5 and the bias node 56 is coupled to the gate terminal of the first of the two shunt transistors (i.e., M6). To interface with the detection circuit 51, the gate terminal of MOSFET M4 is coupled via an inverter 57 to the detection node 54 and the gate terminal of MOSFET M5 is coupled directly to the detection node 54.

In the absence of an ESD event, voltage at the detection node 54 remains at the supply voltage. As a result, transistor M4 is off and transistor M5 is on. An equation representing subthreshold current is as follows:

$$I = I_0 e^{\frac{V_{GS}-V_{TH}}{nV_T}} \left(1 - e^{\frac{-V_{DS}}{nV_T}}\right)$$

By employing transistors with the same size and type (i.e., the same $I_0$ and $V_{th}$ etc.), the subthreshold current may be derived as follows:

$$I_6 = I_0 e^{\frac{V_{GS6}-V_{TH}}{nV_T}} \left(1 - e^{\frac{-V_{DS6}}{nV_T}}\right) = I_0 e^{\frac{-V_{TH}}{nV_T}} \left(1 - e^{\frac{V_{N1}-V_{DD}}{nV_T}}\right)$$

$$I_7 = I_0 e^{\frac{V_{GS7}-V_{TH}}{nV_T}} \left(1 - e^{\frac{-V_{DS7}}{nV_T}}\right) = I_0 e^{\frac{-V_{TH}}{nV_T}} \left(1 - e^{\frac{V_{N1}}{nV_T}}\right)$$

Because the two transistors M6 and M7 are connected in series, the current flow through them will be the same and thereby yield:

$$I_0 e^{\frac{-V_{TH}}{nV_T}} \left(1 - e^{\frac{V_{N1}-V_{DD}}{nV_T}}\right) = I_0 e^{\frac{-V_{TH}}{nV_T}} \left(1 - e^{\frac{V_{N1}}{nV_T}}\right)$$

$$\left(1 - e^{\frac{V_{N1}-V_{DD}}{nV_T}}\right) = \left(1 - e^{\frac{V_{N1}}{nV_T}}\right)$$

$$\frac{V_{N1} - V_{DD}}{nV_T} = \frac{V_{N1}}{nV_T}$$

$$V_{N1} - V_{DD} = V_{N1}$$

$$V_{N1} = \frac{V_{DD}}{2}$$

That is, in the absence of an ESD event, the resulting bias voltage (at the bias node 56) applied to the gate terminal of the first of the two shunt transistors is substantially half of the supply voltage. In this way, the gate-induced drain voltage through the shunt transistors is reduced.

Figure 6A:
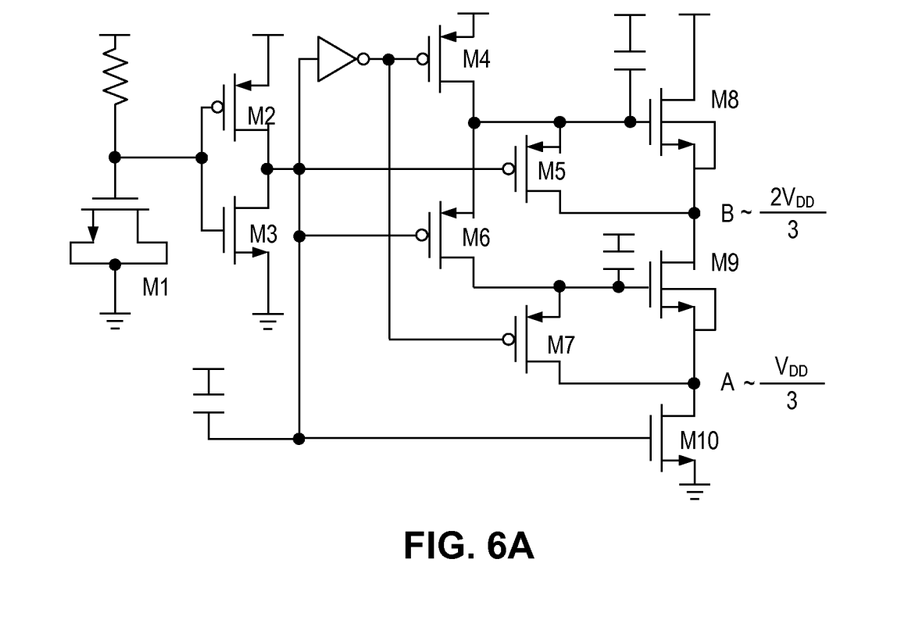
FIG. 6A is a schematic of the second example embodiment of an electrostatic discharge clamp circuit with an extended stack of shunt devices.
Figure 6B:
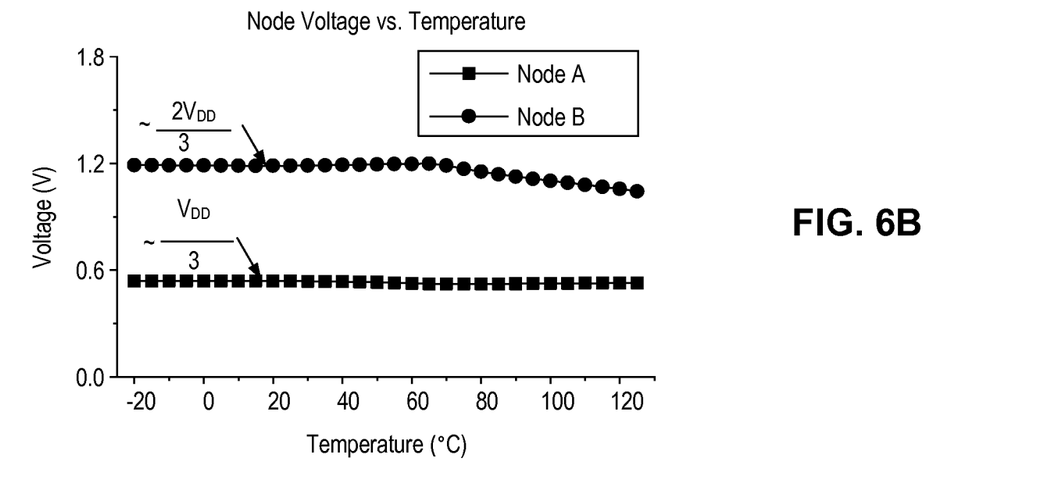
FIG. 6B is a graph illustrating simulated internal node voltage across temperature for the electrostatic discharge clamp circuit shown in FIG. 6A.

This same concept can be extended to a stack of 3 devices as shown in FIG. 6A. In FIG. 6B, simulations across temperature show temperature stability across a wide range (−20° C. to 125° C.). The 3-stack structure provides minimum leakage for this approach and is referred to herein as GIDL-1 approach. Further extending the method to a 4-stack degrades shunt on-current, requiring device up-sizing for sufficient ESD protection and thus leads to higher leakage.

Figure 7:
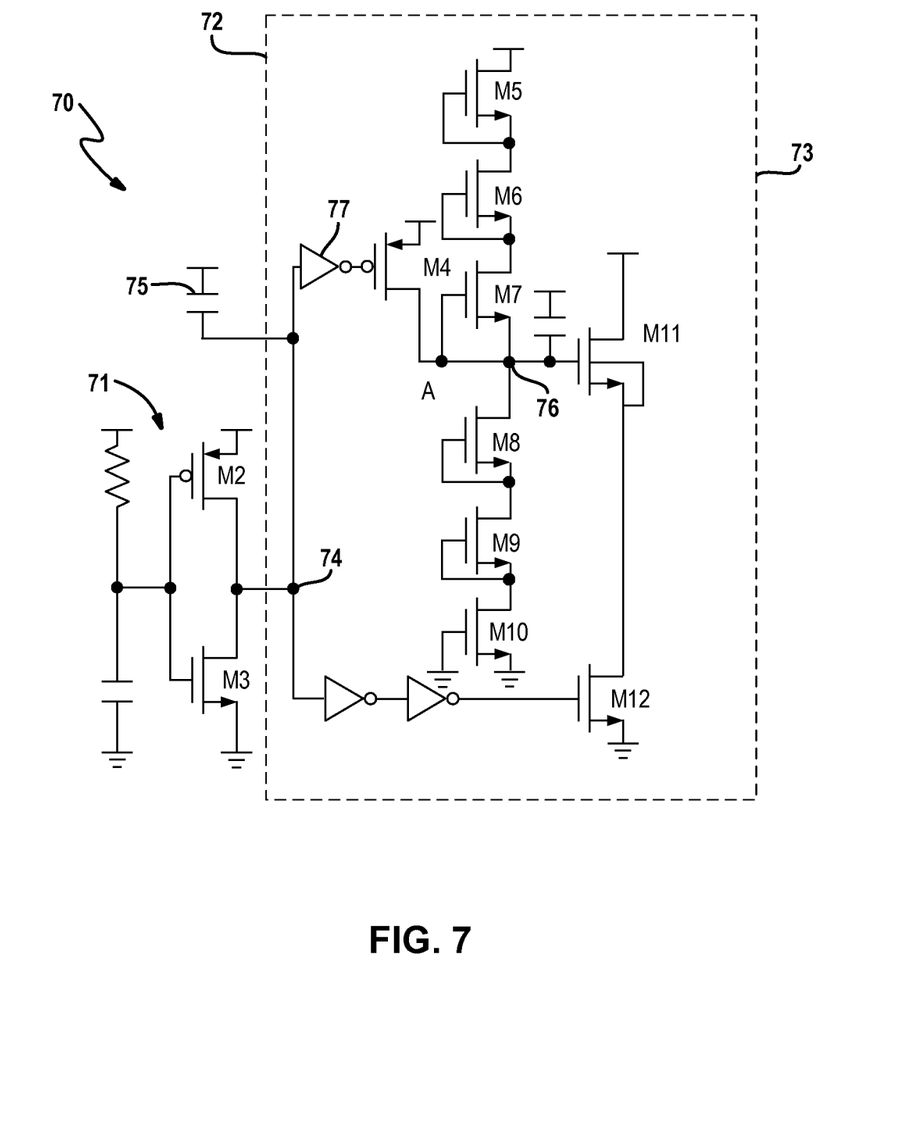
FIG. 7 a schematic of a third example embodiment of an electrostatic discharge clamp circuit with two MOS-based shunt devices.

FIG. 7 depicts another example of a clamp circuit 70 designed with MOS-based structures. The clamp circuit 70 is also comprised of a detection circuit 71, a bias circuit 72 and a shunting circuit 73. The detection circuit 71 is configured to detect an occurrence of an electrostatic charge on a power supply node and triggers discharge of the electrostatic charge through the shunting circuit 73. The bias circuit 72 is electrically coupled between the detection circuit 71 and the shunting circuit 73 and applies a bias voltage to the gate terminal of a shunt transistor. During an electrostatic discharge event, the bias circuit 72 is configured to generate a bias voltage that is substantially equal to the supply voltage; whereas, during the absence of an electrostatic discharge event, the bias circuit 72 is configured to generate a bias voltage that is substantially half of the supply voltage. This second GIDL reduction approach is also referred to herein as GIDL-2.

In an example embodiment, the detection circuit 71 can be implemented in the same manner as described above in relation to FIG. 5. Likewise, the shunting circuit 73 can be implemented by MOSFETs M11, M12 coupled in series with each other in the same manner as described in relation to FIG. 5. To address leakage in the first transistor M2, a capacitor 75 is again preferably coupled between the supply voltage and the detection node 74. Other variants of these circuits as discussed above are also contemplated by this disclosure.

In this second approach, the bias voltage is generated by a diode stack (M5-M10). More specifically, the bias circuit 72 is comprised of an even number of diode-connected n-type MOSFETs M5-M10 coupled in series, such that half of the diode-connected MOSFETs M5-M7 are coupled at a bias node 76 to the other half of the diode-connected MOSFETs M8-M10 and the bias node 76 is coupled to the gate terminal of the shunting transistor M11. The bias circuit 72 further includes a driving p-type MOSFET M4 with its drain terminal coupled to the bias node 76 and its gate terminal coupled via an inverter 77 to the detection node 74. Since there is no need for leaky PMOS switches in GIDL-2, total transistor area and overall leakage is reduced. Note that diode-connected NMOS M5-M10 have minimum W (with increased L) since they only need to overcome the subthreshold leakage of M4 and gate leakage of M11 to maintain VDD/2 at bias node 76. As a result, the diode stack leakage is negligible.

In this design, the leakage of the diode stack M5 to M10 is intentionally made to be larger than the leakage of the driving transistor and the gate leakage of the shunting transistor. That is, the gate terminals of the diode-connected MOSFETs are sized to create a leakage current that is larger than subthreshold leakage of driving MOSFET M4 and larger than gate leakage of MOSFET M11. As a result, in the absence of an ESD event, the voltage at bias node 76 is decided by the leakage of the diode stack. Current through the diode stack is given by $$I_5 = I_0 e^{\frac{V_{GS5}-V_{TH}}{nV_T}} \left(1 - e^{\frac{-V_{DS5}}{nV_T}}\right) = I_0 e^{\frac{-V_{TH}}{nV_T}} \left(1 - e^{\frac{V_{N1}-V_{DD}}{nV_T}}\right)$$

$$I_6 = I_0 e^{\frac{V_{GS6}-V_{TH}}{nV_T}} \left(1 - e^{\frac{-V_{DS6}}{nV_T}}\right) = I_0 e^{\frac{-V_{TH}}{nV_T}} \left(1 - e^{\frac{V_{N2}-V_{N1}}{nV_T}}\right)$$

$$I_7 = I_0 e^{\frac{V_{GS7}-V_{TH}}{nV_T}} \left(1 - e^{\frac{-V_{DS7}}{nV_T}}\right) = I_0 e^{\frac{-V_{TH}}{nV_T}} \left(1 - e^{\frac{V_{N3}-V_{N2}}{nV_T}}\right)$$

$$I_8 = I_0 e^{\frac{V_{GS8}-V_{TH}}{nV_T}} \left(1 - e^{\frac{-V_{DS8}}{nV_T}}\right) = I_0 e^{\frac{-V_{TH}}{nV_T}} \left(1 - e^{\frac{V_{N4}-V_{N3}}{nV_T}}\right)$$

-continued $$I_9 = I_0 e^{\frac{V_{GS9}-V_{TH}}{nV_T}}\left(1-e^{\frac{-V_{DS9}}{nV_T}}\right) = I_0 e^{\frac{-V_{TH}}{nV_T}}\left(1-e^{\frac{V_{N5}-V_{N4}}{nV_T}}\right)$$

$$I_{10} = I_0 e^{\frac{V_{GS10}-V_{TH}}{nV_T}}\left(1-e^{\frac{-V_{DS10}}{nV_T}}\right) = I_0 e^{\frac{-V_{TH}}{nV_T}}\left(1-e^{\frac{-V_{N5}}{nV_T}}\right)$$

Following the procedure similar to the one used in FIG. 3 it follows:

$$V_{N2}-V_{N1}=V_{N1}-V-_{DD}$$

$$V_{N3}-V_{N2}=V_{N2}-V-_{N1}$$

$$V_{N4}-V_{N3}=V_{N3}-V-_{N2}$$

$$V_{N5}-V_{N4}=V_{N4}-V_{N3}$$

$$-V_{N5}=V_{N5}-V_{N4}$$

and by solving these equations yields in:

$$V_{N1} = \frac{5V_{DD}}{6}$$

$$V_{N2} = \frac{4V_{DD}}{6}$$

$$V_{N3} = \frac{3V_{DD}}{6}$$

$$V_{N4} = \frac{2V_{DD}}{6}$$

$$V_{N5} = \frac{V_{DD}}{6}$$

such that the bias voltage at the bias node is:

$$V_A = V_{N3} = \frac{3V_{DD}}{6} = \frac{V_{DD}}{2}$$

In other words, the resulting bias voltage as applied to the gate terminal of the shunt transistor M11 is substantially half of the supply voltage in the absence of an ESD event.

Figure 8A:
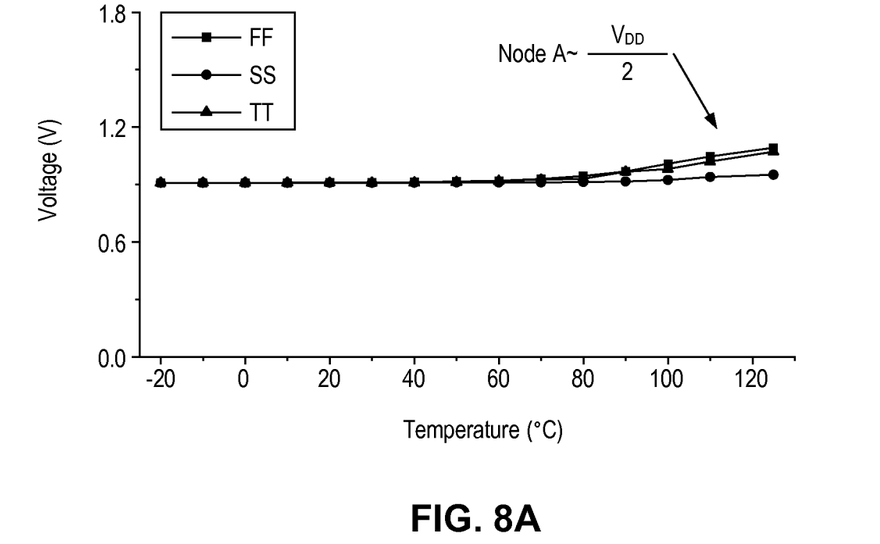
FIG. 8A is a graph depicting simulated internal node voltage across temperature for the electrostatic discharge clamp circuit shown in FIG. 7.
Figure 8B:
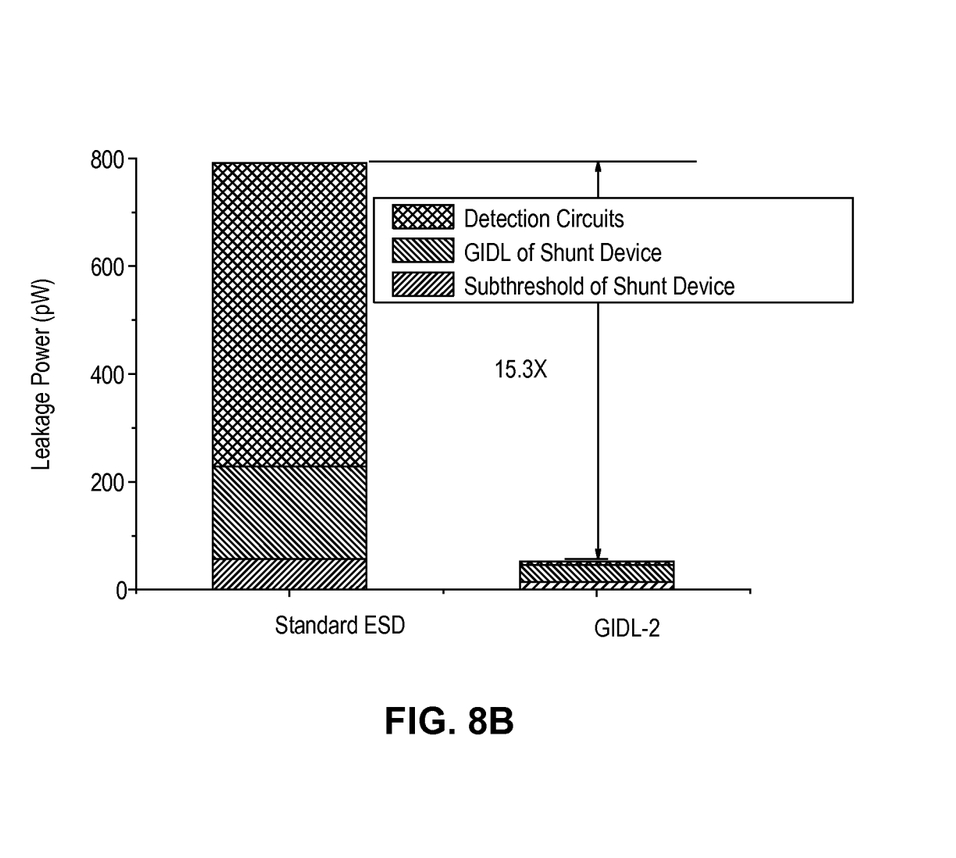
FIG. 8B is a graph depicting the leakage power breakdown for the electrostatic discharge clamp circuit shown in FIG. 7.

Simulations across temperature/process show the stability of voltage at the bias node 76 as seen in FIG. 8A. During an ESD event, the bias node 76 is charged to supply voltage VDD through M4 and then slowly discharges to VDD/2 through the diode stack. During this relaxation time (350 μs in simulation), the ESD clamp experiences substantial gate-induced drain leakage. However, since ESD events are rare, the impact on total energy is minimal and the low quiescent current of the structure far outweighs it. Simulated leakage power breakdown of GIDL-2 is shown in FIG. 8B, showing a 15.3-115× reduction (25-125° C.) compared to a conventional commercial clamp.

Figure 9:
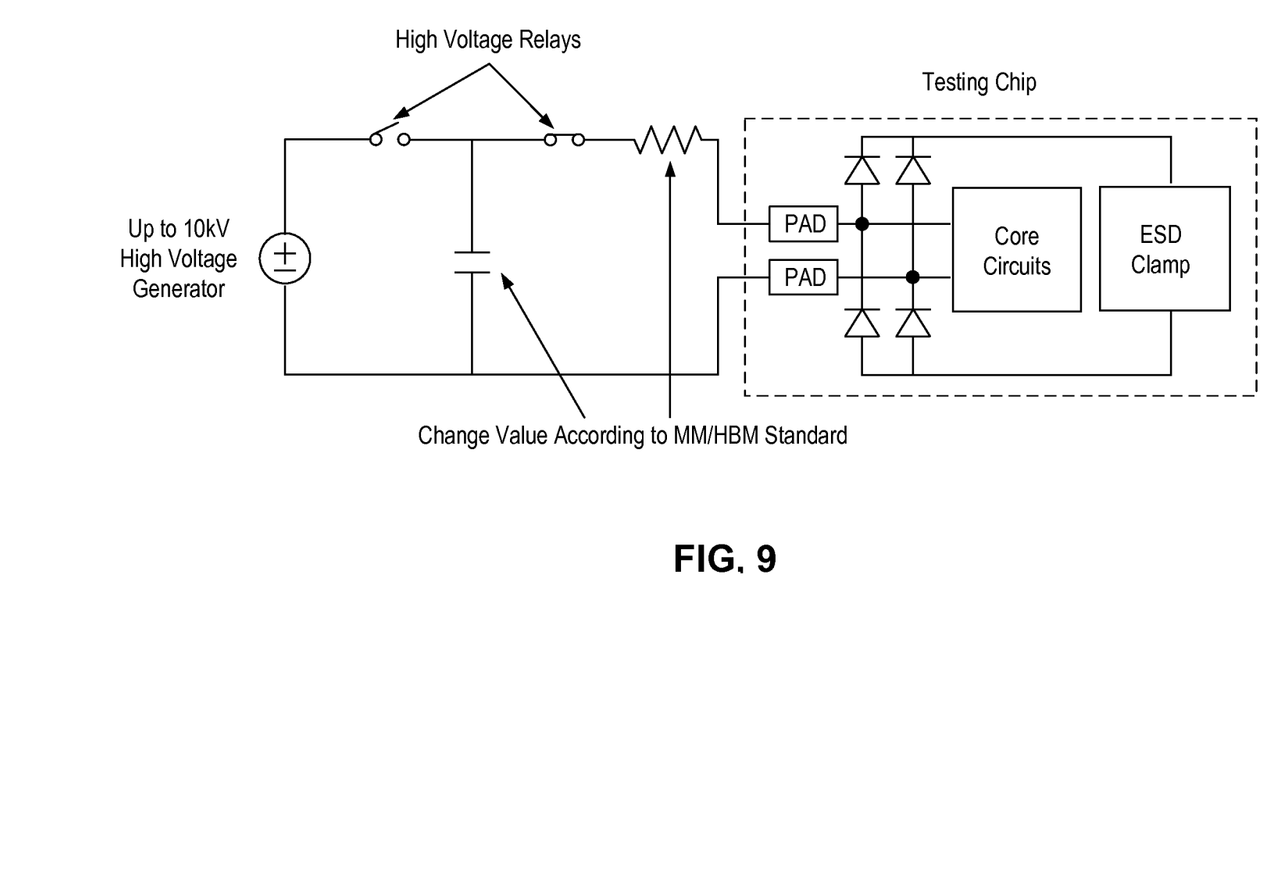
FIG. 9 is a schematic of an example test setup for evaluating ESD clamp circuits.

For testing purposes, the three proposed ESD clamp circuits (BJT, GIDL-1, GIDL-2) and a commercial ESD clamp circuit (baseline) were fabricated in a standard 180 nm CMOS process. In addition, an ESD structure using smaller devices and offering a lower protection level was integrated with a mm-scale microsystem to meet its nW system power budget. Each of these ESD structures were evaluated using the human body model (HBM) and machine model (MM). An example testing setup is shown in FIG. 9. Device leakage current is measured after each discharge of the HBM or MM test. The present disclosure use a conventional definition of failure, namely the smallest voltage at which either the structure exhibits a 30% increase in leakage, or an analog block connected to the ESD pads functionally fails.

Figure 10A:
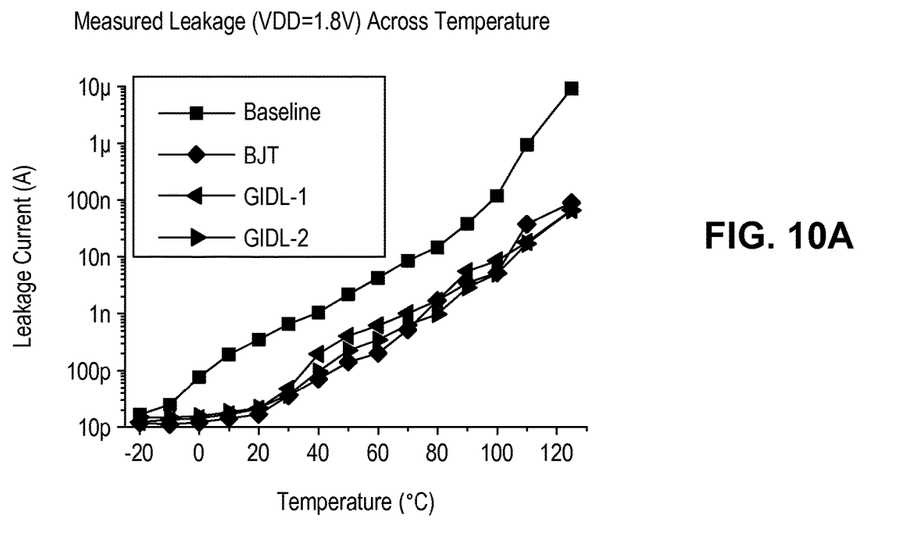
FIGS. 10A and 10B are graphs depicting measured leakage results across temperature and power supply, respectively.
Figure 10B:
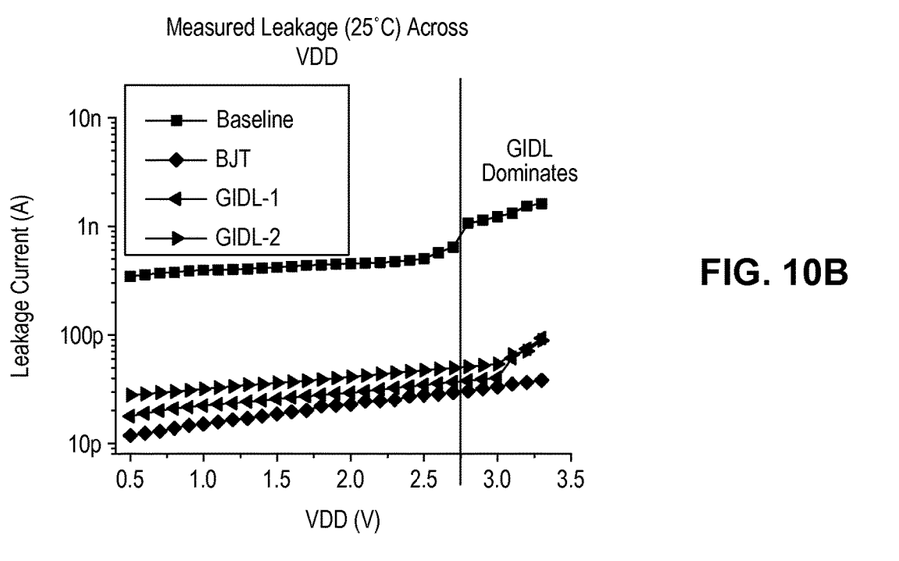
Figure 11:
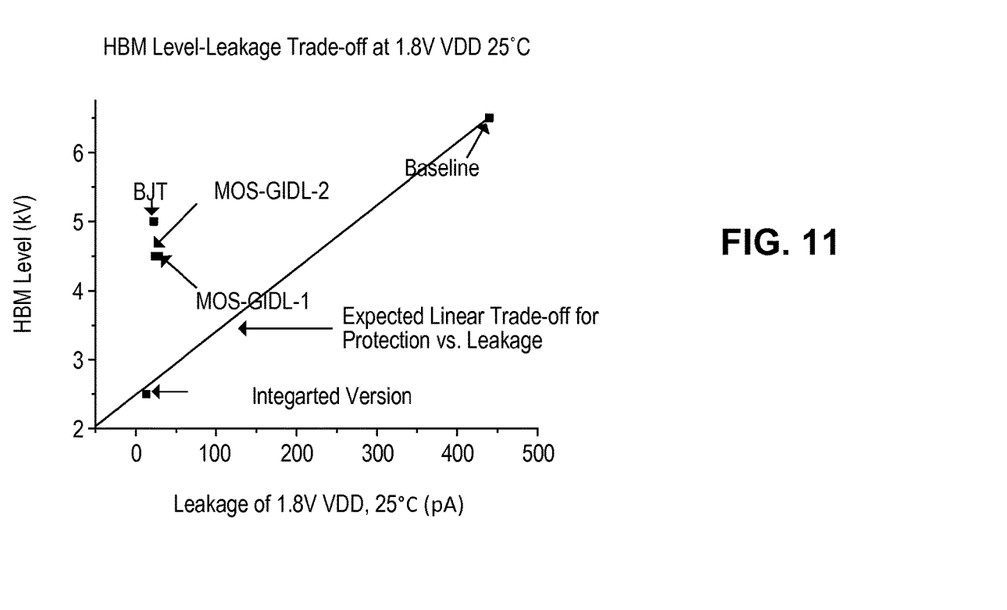
FIG. 11 is a scatter plot showing leakage for the evaluated ESD clamp circuits.
Figure 12:
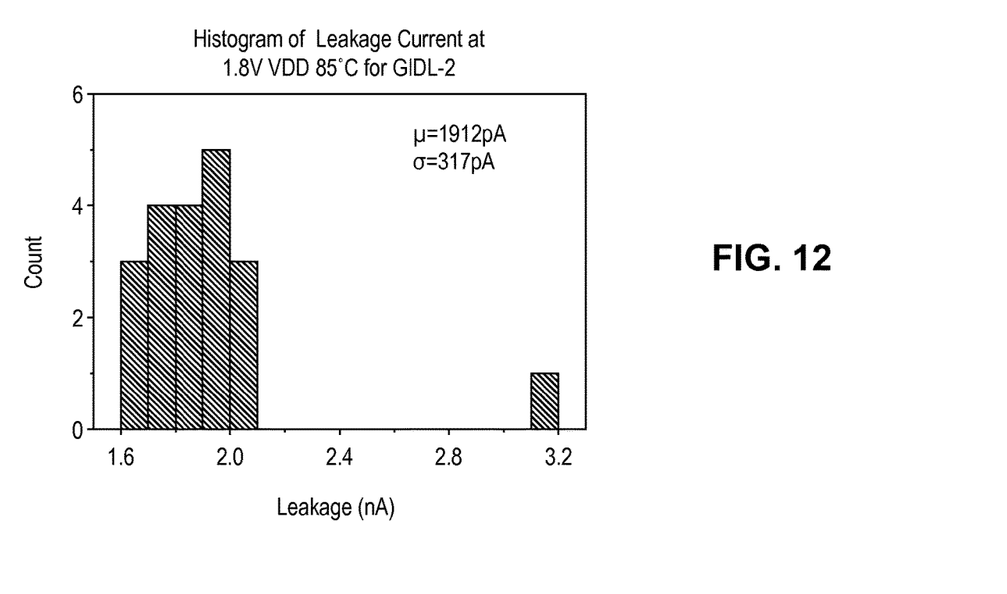
FIG. 12 is a histogram depicting leakage current for the electrostatic discharge clamp circuit shown in FIG. 7.

The measured leakage of each structure across temperature and VDD is shown in FIGS. 10A and 10B, respectively. The proposed clamp circuits have lower leakage than the baseline design throughout the temperature range of 0° C. to 125° C. and VDD from 0.5V to 3.3V. The BJT structure has the lowest leakage (22 pA) at room temperature, a twenty times reduction over the baseline. At 125° C., GIDL-1 and GIDL-2 structures consume 67.8 nA and 66 nA, respectively, compared to 16.52 pA for the baseline. A scatter plot showing ESD protection and leakage (25° C.) of the four measured structures is also given in FIG. 11. The expected linear trend between protection level and leakage highlights the gains achieved by the proposed structures beyond straightforward device down-sizing. A histogram of leakage current for GIDL-2 at 85° C. and 1.8V across 20 measured dies from one wafer is shown in FIG. 12. Nearly all dies consume 1.6-2.1 nA with average leakage of 1.91 nA and standard deviation of 317 pA. The integrated version shows 13 pA leakage at 25° C. with 2.5 kV HBM level and 300V MM level. Table 1 below provides a summary table including a comparison of HBM and MM levels of the proposed structures to both the two baseline structures. Overall the proposed GIDL-2 structure provides 18-139× leakage reduction over commercial ESD clamps with 70-100% of ESD protection levels while avoiding special devices such as silicon-controlled rectifiers.

TABLE 1

| ESD Structure | Technology | Area (μm²) | HBM Level (kV) | MM Level (V) | Leakage 1.8 V, 25° C. | Leakage 1.8 V, 125° C. |
|---|---|---|---|---|---|---|
| Baseline Commercial Clamp | 0.18 μm | 17500 | 6.5 | 400 | 440 pA | 9.18 μA |
| BJT | 0.18 μm | 67200 | 5.0 | 350 | 22 pA | 88.1 nA |
| GIDL-1 | 0.18 μm | 67200 | 4.5 | 400 | 28 pA | 67.8 nA |
| GIDL-2 | 0.18 μm | 44800 | 4.5 | 400 | 24 pA | 66 nA |
| Integrated Version Got mm³ system [5] | 0.18 μm | 35000 | 2.5 | 300 | 13 pA | 41 nA |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrostatic discharge clamp circuit for low power applications, comprising:
    a shunting circuit electrically coupled between a supply voltage and ground and comprised of at least one shunt transistor;
    a detection circuit electrically coupled between the supply voltage and ground, the detection circuit is configured to detect an occurrence of an electrostatic charge on a power supply node and trigger discharge of the electrostatic charge through the shunt transistor; and a bias circuit electrically coupled between the detection circuit and the shunting circuit and the bias circuit applies a bias voltage to the gate terminal of the shunt transistor and to body of the shunt transistor during absence of an electrostatic discharge event, where the bias voltage is substantially half of the supply voltage.

2. The clamp circuit of claim 1 further comprises a capacitor electrically coupled between the supply voltage and a detection node, where the detection circuit is electrically connected via the detection node to the bias circuit.

3. The clamp circuit of claim 1 wherein the detection circuit is implemented by a static CMOS inverter having an input coupled to an RC filter.

4. The clamp circuit of claim 3 wherein the RC filter employs a metal-insulator-metal capacitor.

5. The clamp circuit of claim 1 wherein the shunt circuit is comprised of a first metal-oxide-semiconductor field-effect transistor (MOSFET) and a second MOSFET, where a drain terminal of the first MOSFET is coupled to the supply voltage, a source terminal of the first MOSFET is coupled to a drain terminal of the second MOSFET, and a source terminal of the second MOSFET is coupled to ground.

6. The clamp circuit of claim 5 wherein the first MOSFET has a gate terminal sized the same as the gate terminal of the second MOSFET and the first MOSFET having the same type of charge carrier as the second MOSFET.

7. The clamp circuit of claim 5 wherein the bias circuit applies a bias voltage a gate terminal of the first MOSFET, where the bias voltage is substantially equal to the supply voltage during an electrostatic discharge event and the bias voltage is substantially half of the supply voltage during absence of an electrostatic discharge event.

8. The clamp circuit of claim 7 wherein the bias circuit is comprised of a third MOSFET coupled in series with a fourth MOSFET, where a source terminal of the third MOSFET is coupled to the supply voltage, a drain terminal of the third MOSFET is coupled at a bias node to a source terminal of the fourth MOSFET, a drain terminal of the fourth MOSFET is coupled to the drain terminal of the second MOSFET, and the bias node is coupled to the gate terminal of the first MOSFET.

9. The clamp circuit of claim 8 wherein the gate terminal of the third MOSFET is coupled via an inverter to the detection node and the gate terminal of the fourth MOSFET is coupled to the detection node.

10. The clamp circuit of claim 8 further comprises a capacitor electrically coupled between the supply voltage and the bias node.

11. The clamp circuit of claim 7 wherein the bias circuit is comprised of an even number of diode-connected MOSFETs coupled in series, where one half of the diode-connected MOSFETs are coupled at a bias node to the other half of the diode-connected MOSFETs and the bias node is coupled to the gate terminals of the first MOSFET.

12. The clamp circuit of claim 11 wherein the bias circuit further includes a driving MOSFET with a source terminal coupled to the supply voltage, the drain terminal coupled to the bias node and a gate terminal coupled via an inverter to the detection node.

13. The clamp circuit of claim 11 wherein the gate terminals of the diode-connected MOSFETs are sized to create a leakage current that is larger than subthreshold leakage of driving MOSFET and larger than gate leakage of the first MOSFET.

14. A clamp circuit for low power applications, comprising:

a shunting circuit comprised of two shunt transistors electrically coupled between a supply voltage and ground and in series to each other;
a detection circuit electrically coupled between the supply voltage and ground, wherein the detection circuit is electrically connected via a detection node to the shunting circuit and configured to discharge an electrostatic charge through the two shunt transistors;
a capacitor electrically coupled between the supply voltage and the detection node; and
a bias circuit electrically coupled to a gate terminal of a first of the two shunt transistors and applies a bias voltage to the gate terminal during absence of an electrostatic discharge event, where the bias circuit is comprised of a first p-type metal-oxide-semiconductor field-effect transistor (MOSFET) coupled in series with a p-type second MOSFET, where a source terminal of the first MOSFET is coupled to the supply voltage, a drain terminal of the first MOSFET is coupled at a bias node to a source terminal of the second MOSFET, a drain terminal of the first MOSFET is coupled to a node interconnecting the two shunt transistors, and the bias node is coupled to the gate terminal of the first of the two shunt transistors.

15. The clamp circuit of claim 14 wherein the gate terminal of the first MOSFET is coupled via an inverter to the detection node and the gate terminal of the second MOSFET is coupled to the detection node.

16. The clamp circuit of claim 14 wherein the two shunting transistors have gate terminals sized the same and have the same type of charge carrier.

17. The clamp circuit of claim 14 wherein the bias circuit applies a bias voltage a gate terminal of the first of the two shunting transistors, where the bias voltage is substantially equal to the supply voltage during an electrostatic discharge event and the bias voltage is substantially half of the supply voltage during absence of an electrostatic discharge event.

18. The clamp circuit of claim 14 further comprises a capacitor electrically coupled between the supply voltage and the bias node.

19. The clamp circuit of claim 14 wherein the detection circuit is implemented by a static CMOS inverter having an input coupled to an RC filter.

20. The clamp circuit of claim 19 wherein the RC filter employs a metal-insulator-metal capacitor.

21. A clamp circuit for low power applications, comprising:

a shunting circuit comprised of two shunt transistors electrically coupled between a supply voltage and ground and in series to each other;
a detection circuit electrically coupled between the supply voltage and ground, wherein the detection circuit is electrically connected via a detection node to the shunting circuit and configured to discharge an electrostatic charge through the two shunt transistors;
a capacitor electrically coupled between the supply voltage and the detection node; and
a bias circuit electrically coupled to a gate terminal of a first of the two shunt transistors and applies a bias voltage to the gate terminal and to body of the first of the two shunt transistors during absence of an electrostatic discharge event, where the bias circuit is comprised of an even number of diode-connected n-type MOSFETs coupled in series, where one half of the diode-connected MOSFETs are coupled at a bias node to the other half of the diode-connected MOSFETs and the bias node is coupled to the gate terminals of the first MOSFET.

22. The clamp circuit of claim 21 wherein the bias circuit applies a bias voltage a gate terminal of the first of the two shunting transistors, where the bias voltage is substantially equal to the supply voltage during an electrostatic discharge event and the bias voltage is substantially half of the supply voltage during absence of an electrostatic discharge event.

23. The clamp circuit of claim 22 wherein the bias circuit further includes a driving p-type MOSFET with a source terminal coupled to the supply voltage, the drain terminal coupled to the bias node and a gate terminal coupled via an inverter to the detection node.

24. The clamp circuit of claim 23 wherein the gate terminals of the diode-connected MOSFETs are sized to create a leakage current that is larger than subthreshold leakage of driving MOSFET and larger than gate leakage of the first MOSFET.

25. The clamp circuit of claim 21 further comprises a capacitor electrically coupled between the supply voltage and the bias node.

26. The clamp circuit of claim 21 wherein the detection circuit is implemented by a static CMOS inverter having an input coupled to an RC filter.

27. The clamp circuit of claim 26 wherein the RC filter employs a metal-insulator-metal capacitor.

\* \* \* \* \*